(12) United States Patent
Deplante

(10) Patent No.: US 12,006,061 B2
(45) Date of Patent: Jun. 11, 2024

(54) YOKE MOUNT DEVICE HOLDER

(71) Applicant: Basile G. E. Deplante, Sunnyvale, CA (US)

(72) Inventor: Basile G. E. Deplante, Sunnyvale, CA (US)

( * ) Notice: Subject to any disclaimer, the term of this patent is extended or adjusted under 35 U.S.C. 154(b) by 0 days.

(21) Appl. No.: 17/674,819

(22) Filed: Feb. 17, 2022

(65) Prior Publication Data

US 2022/0185498 A1 Jun. 16, 2022

(51) Int. Cl.
*B64D 43/00* (2006.01)
*F16B 2/08* (2006.01)

(52) U.S. Cl.
CPC .............. *B64D 43/00* (2013.01); *F16B 2/08* (2013.01)

(58) Field of Classification Search
CPC .................................... B64D 3/00; F16B 2/08
USPC ...... 248/346.01, 346.03, 346.06, 346.5, 441, 248/444, 448; 224/276, 560, 558, 545, 224/548, 555; 108/42, 44, 45
See application file for complete search history.

(56) References Cited

U.S. PATENT DOCUMENTS

| | | | | |
|---|---|---|---|---|
| 2,603,896 A * | 7/1952 | Bennett | ................... | B64D 43/00 362/191 |
| 4,998,185 A * | 3/1991 | DeNigris, Jr. | ............ | A45F 5/00 248/444 |
| 7,887,021 B2 * | 2/2011 | Shevin-Sandy | ...... | F16M 11/041 70/57.1 |
| 8,608,037 B2 * | 12/2013 | Stroh | ..................... | B60N 3/005 224/276 |
| 10,520,128 B2 | 12/2019 | Longo | ..................... | G06F 3/041 |
| 2010/0301080 A1 * | 12/2010 | Heckman | ............... | B64D 43/00 224/401 |
| 2012/0285289 A1 * | 11/2012 | Walker | ................... | B62D 1/043 74/558 |

* cited by examiner

*Primary Examiner* — Alfred J Wujciak
(74) *Attorney, Agent, or Firm* — University of San Francisco School of Law

(57) ABSTRACT

A yoke mount device holder comprises a yoke attachment surface and a device interface surface. The yoke mount device holder attaches a device to a yoke of an aircraft. The yoke attachment surface is attached to the yoke via straps. Straps are passed through channels that are formed between the yoke attachment surface and the device interface surface. Fasteners attach the device to the device interface surface. In operation, a pilot attaches a device to the yoke mount device holder to the yoke of an aircraft. Next, the pilot can then attach and detach their device to the holder quickly and easily via the fasteners. The yoke mount device holder is universally mountable to any style yoke, increases the pilot's visibility, and does not weigh down the yoke as compared to conventional mounting devices. The yoke mount device holder is inexpensive to manufacture as compared to conventional mounting devices.

8 Claims, 10 Drawing Sheets

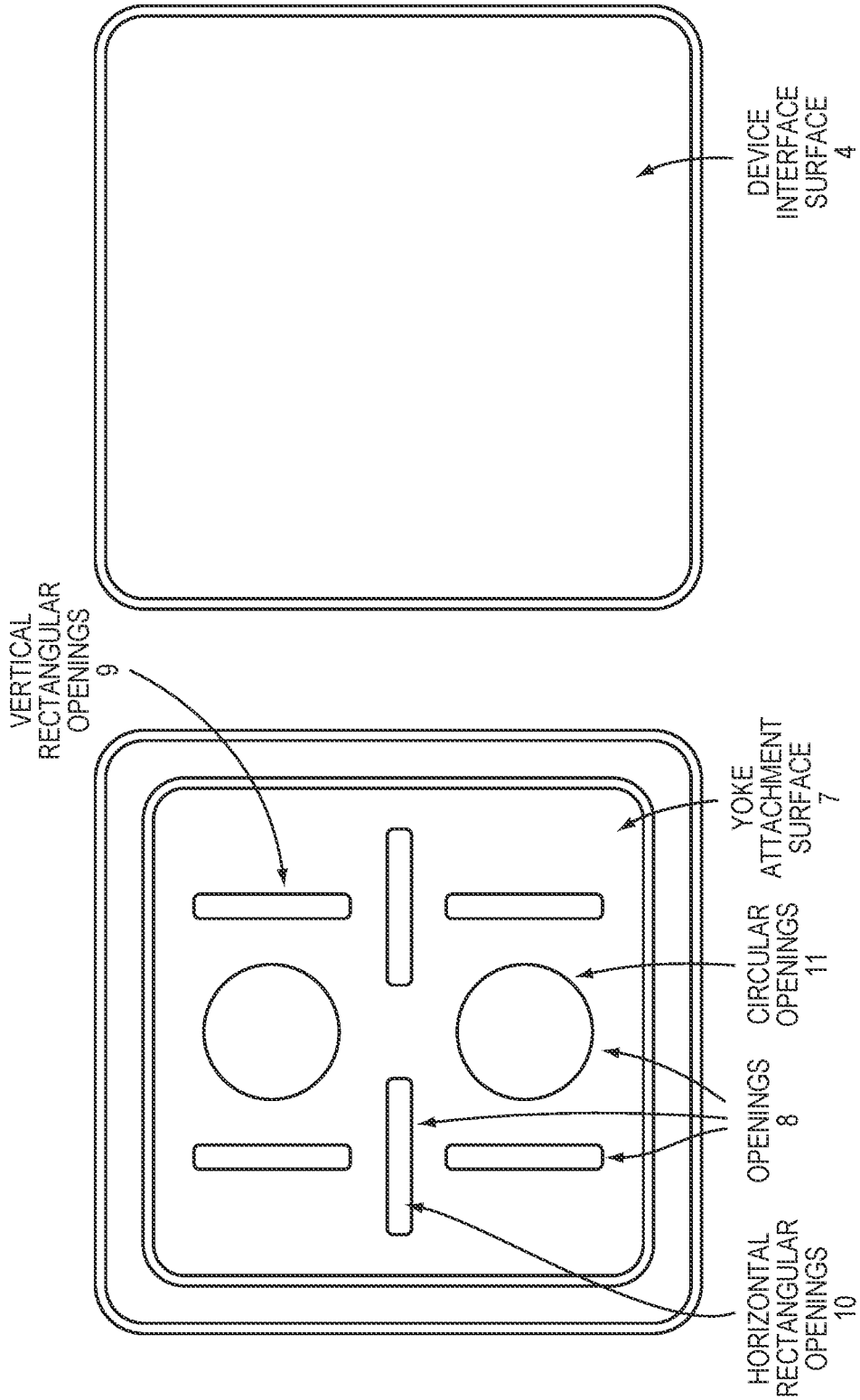

YOKE MOUNT DEVICE HOLDER

TECHNICAL FIELD

The present invention relates generally to electronic device accessories, and more specifically, to device holders.

BACKGROUND INFORMATION

Network enabled devices, such as mobile phones and tablets, are becoming increasingly more mobile. Such devices provide functionality during operation of a vehicle. A vehicle operator may wish to use such a device without having to hold the device while operating the vehicle. Various holders exist to mount devices during vehicle operation without distracting the vehicle operator.

SUMMARY

A yoke mount device holder comprises a yoke attachment surface and a device interface surface. The yoke mount device holder attaches a device to a yoke of an aircraft. The yoke attachment surface is attached to the yoke via straps. Straps are passed through channels that are formed between the yoke attachment surface and the device interface surface. Fasteners attach the device to the device interface surface. In one example, the device is a tablet computing device that runs mobile applications used by the pilot during operation of the aircraft.

In one embodiment, the yoke attachment surface comprises a plurality of openings. The openings assist a pilot in passing the straps through the channels when attaching the yoke attachment surface to the yoke. The number, size, and shape of the openings vary across different embodiments. In other embodiments, the yoke attachment surface does not include any openings.

The yoke mount device holder is formed from low cost materials and is cheaper to manufacture as compared with conventional device mounts. The yoke mount device holder is formed via additive manufacturing (3D printing, etc.), subtractive manufacturing (CNC machining, etc.), or injection molding.

Conventional device holders are limited in their use and application. For example, conventional claw mounts tend to be limited in use to one particular style yoke. Conventional knee strap mounts are uncomfortable and tend to disrupt a pilot's line of sight by encouraging the pilot to look down and away from the cockpit. Conventional window mounts interfere with a pilot's line of sight and tend to limit pilot visibility out of the cockpit.

In operation, a pilot attaches a device to the yoke mount device holder to the yoke of an aircraft. Next, the pilot can then attach and detach their device to the holder quickly and easily via the fasteners. The yoke mount device holder is universally mountable to any style yoke, increases the pilot's visibility, and does not weigh down the yoke as compared to conventional mounting devices. The yoke mount device holder is inexpensive to manufacture as compared to conventional mounting devices.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 4 shows the yoke attachment surface facing forward to show the openings.

FIG. 5 is a diagram showing the device interface surface without the fasteners attached.

DETAILED DESCRIPTION

Reference will now be made in detail to some embodiments of the invention, examples of which are illustrated in the accompanying drawings.

Figure 1:
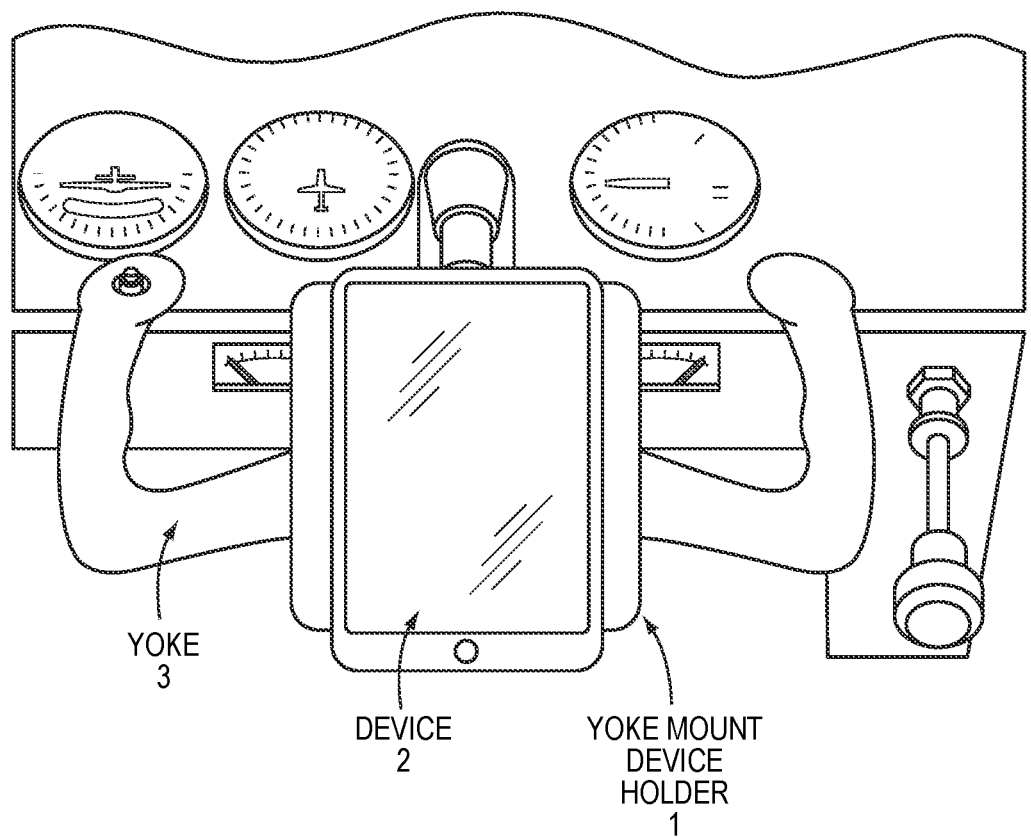
FIG. 1 is a diagram of a front view of a yoke mount device holder.

FIG. 1 is a diagram of a front view of a yoke mount device holder 1. The yoke mount device holder 1 attaches a device 2 to a yoke 3 of an aircraft. The yoke mount device holder 1 allows the device 2 to be mounted such that it provides a clear line of sight for the pilot. The pilot is able to use and view the device 2 and operate the yoke 3 without the device 2 obstructing the pilot's view. The yoke mount device holder 1 is lightweight so that it does not interfere with the pilot's ability to control the plane. The yoke mount device holder 1 is easily removable from the yoke 3. Any type of device, such as a tablet or mobile phone, is attachable to the yoke mount device holder 1. The yoke mount device holder 1 can be used with a variety of vehicles including but not limited to planes, helicopters, boats, or any other vessel having a control wheel.

Figure 2:
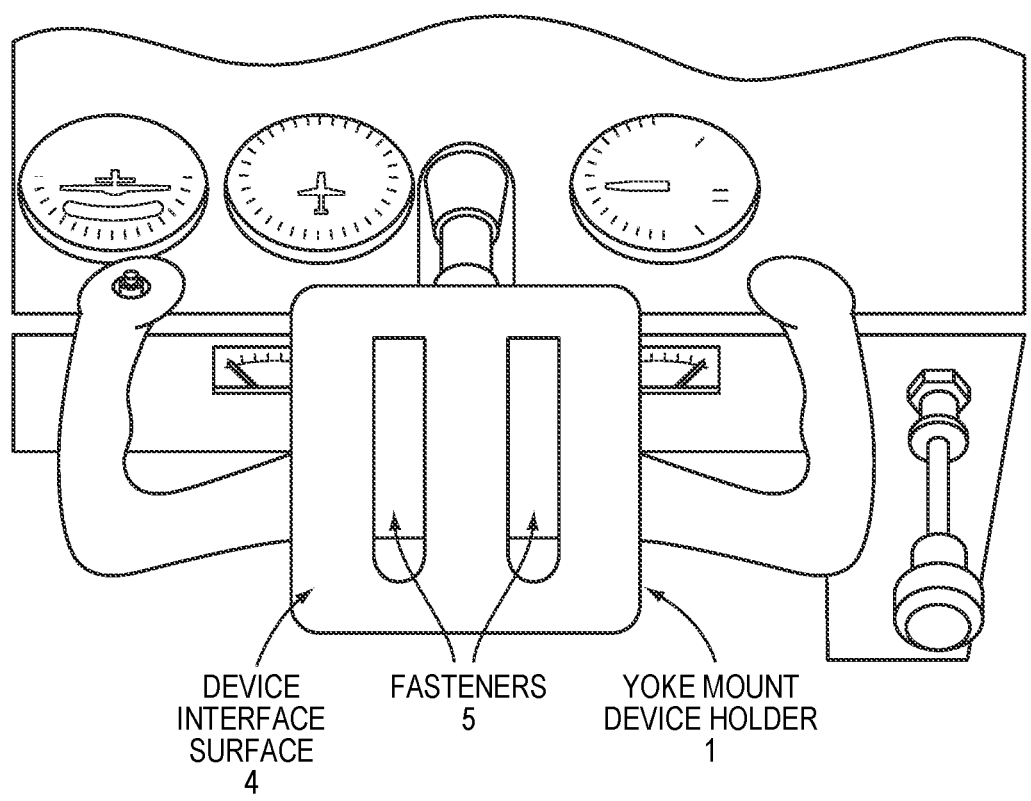
FIG. 2 is a diagram showing the device detached from the yoke mount device holder.

FIG. 2 is a diagram showing the device 2 detached from the yoke mount device holder 1. The device 2 attaches to and detaches from a device interface surface 4 of the holder 1 via fasteners 5 (shown in FIG. 3). The novel holder 1 provides easy attachment and detachment of the device 2. When a pilot enters the cockpit, the pilot is able to quickly attach their device 2 to the holder 1. When the pilot exits the cockpit, the pilot is able to easily remove their device 2 from the holder 1 prior to exiting the aircraft. The next pilot to enter the cockpit can then attach their device 2 with ease without needing to remove the yoke mount device holder 1 from the yoke 3.

Figure 3:
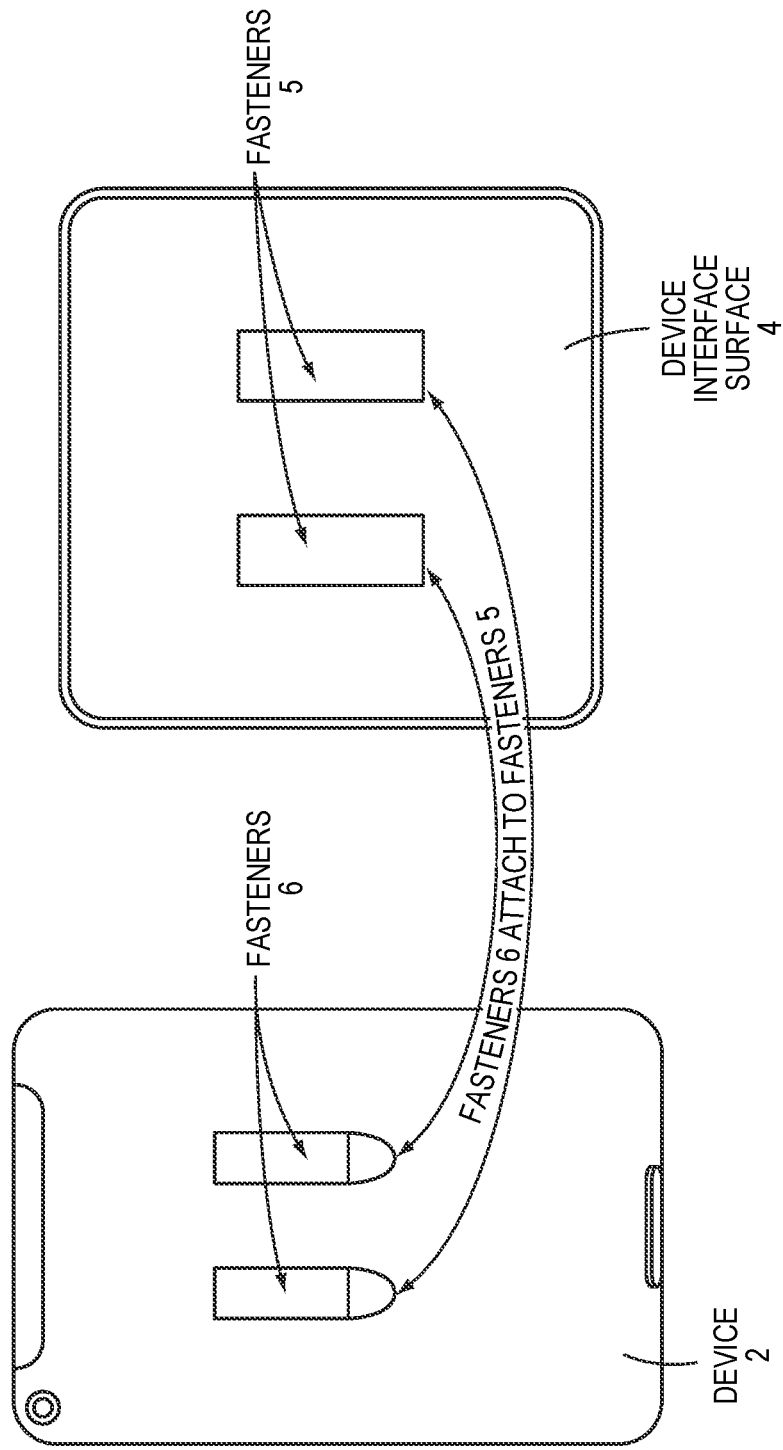
FIG. 3 is a diagram showing fasteners on a device connected to fasteners on the device interface surface.

FIG. 3 is a diagram showing fasteners 6 connected to fasteners 5 on the device interface surface 4. The device or device case 2 is attached and detached from the device interface surface 4. The device 2 could be attached to the device interface surface 4 via a variety of fastener types, including but not limited to: an adhesive layer, hook and loop fastener(s), hook and clip fastener(s), or a mechanical connector. Although four fasteners 5 and 6 are shown in FIG. 3, in other embodiments only two fasteners are used, one fastener attached to the device interface surface 4 and a second attached to the device 1.

FIG. 4 shows the yoke attachment surface 7 with openings 8. In this example, the yoke attachment surface 7 includes four (4) vertical rectangular openings 9, two (2) horizontal rectangular openings 10, and two (2) circular openings 11. The openings 8 and channels 12 allow for the straps 13 to be passed through them to secure the yoke mount device holder 1 to the yoke 3 of an aircraft in any desired orientation. The openings 8 aid in feeding the straps 13 through the channels 12 by providing access to the straps 13. The variety of different openings 8 and channels 12 provide flexibility in how the yoke mount device holder 1 is to be attached to the yoke 3. Not all of the openings 8 or channels 12 need to be used when attaching the yoke mount device holder 1 to the yoke 3. In one embodiment of the device, there are no openings in the yoke attachment surface 7. The straps 13 will only be passed through the channels 12. In another embodiment of the device, there are a number of different openings 8 having different orientations, sizes, and positions.

FIG. 5 is a diagram showing the device interface surface 4 without the fasteners 5 attached. The device 2 attaches to the device interface surface 4.

Figure 6:
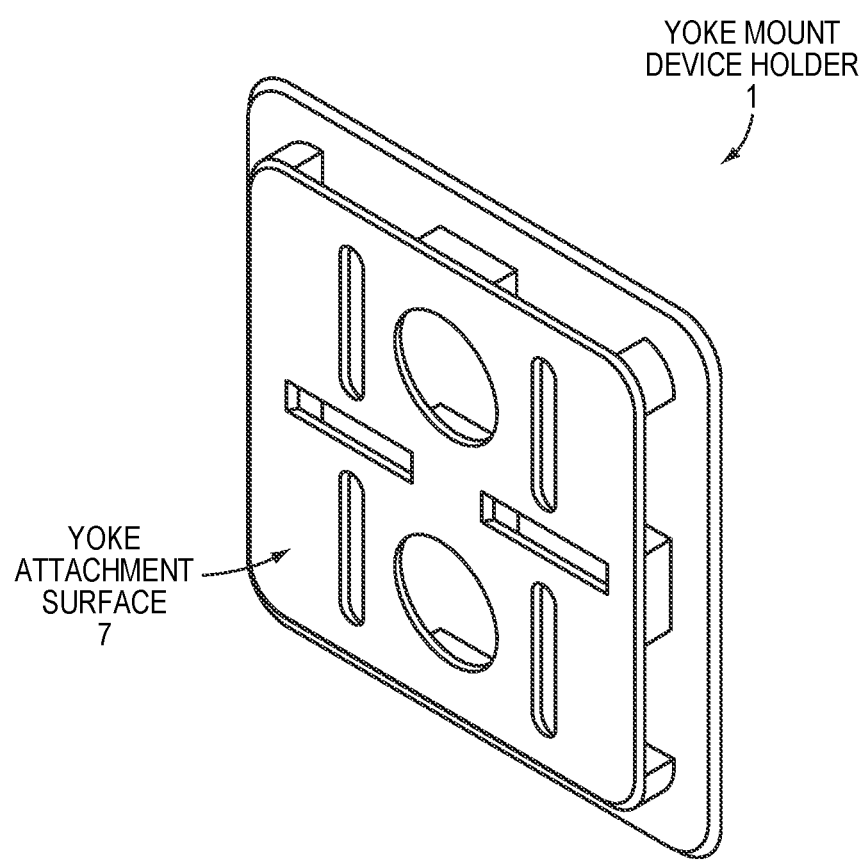
FIG. 6 shows a prospective view of one embodiment of a yoke mount device holder with the yoke attachment surface facing forward.

FIG. 6 shows a prospective view of one embodiment of a yoke mount device holder 1 with the yoke attachment surface 7 facing forward. The yoke mount device holder 1 comprises the yoke attachment surface 7 and the device interface surface 4. A device 2, such as a tablet, attaches to the device interface surface 4 through the use of fasteners 5, and the yoke attachment surface 7 attaches to the yoke 3 of an aircraft through the use of straps 13.

Figure 7:
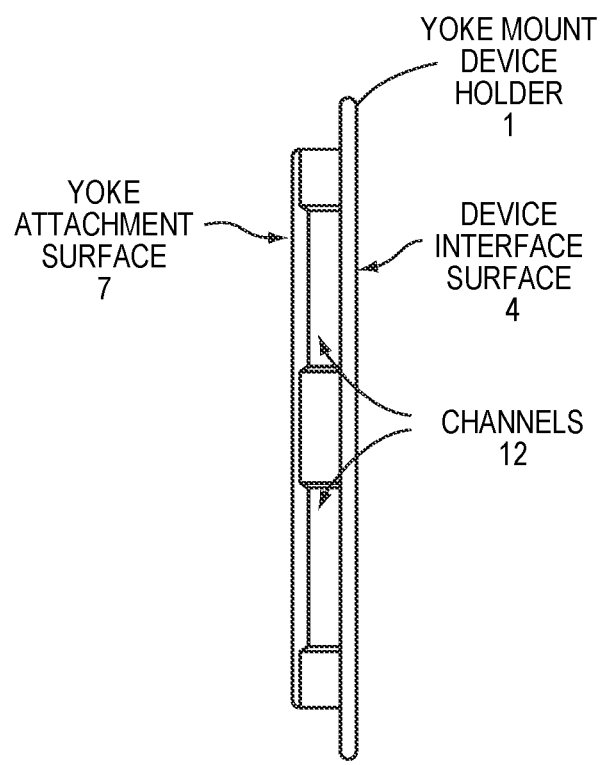
FIG. 7 is a diagram showing a side view of the yoke mount device holder to show one aspect of the channels.

FIG. 7 is a diagram showing a side view of the yoke mount device holder 1. The device interface surface 4 and the yoke attachment surface 7 form channels 12 between the device interface surface 4 and the yoke attachment surface 7. The straps 13 are fed through channels 12 to secure the yoke attachment surface 7 to the yoke 3 of an aircraft and can be adjusted in any manner and for any yoke size.

Figure 8:
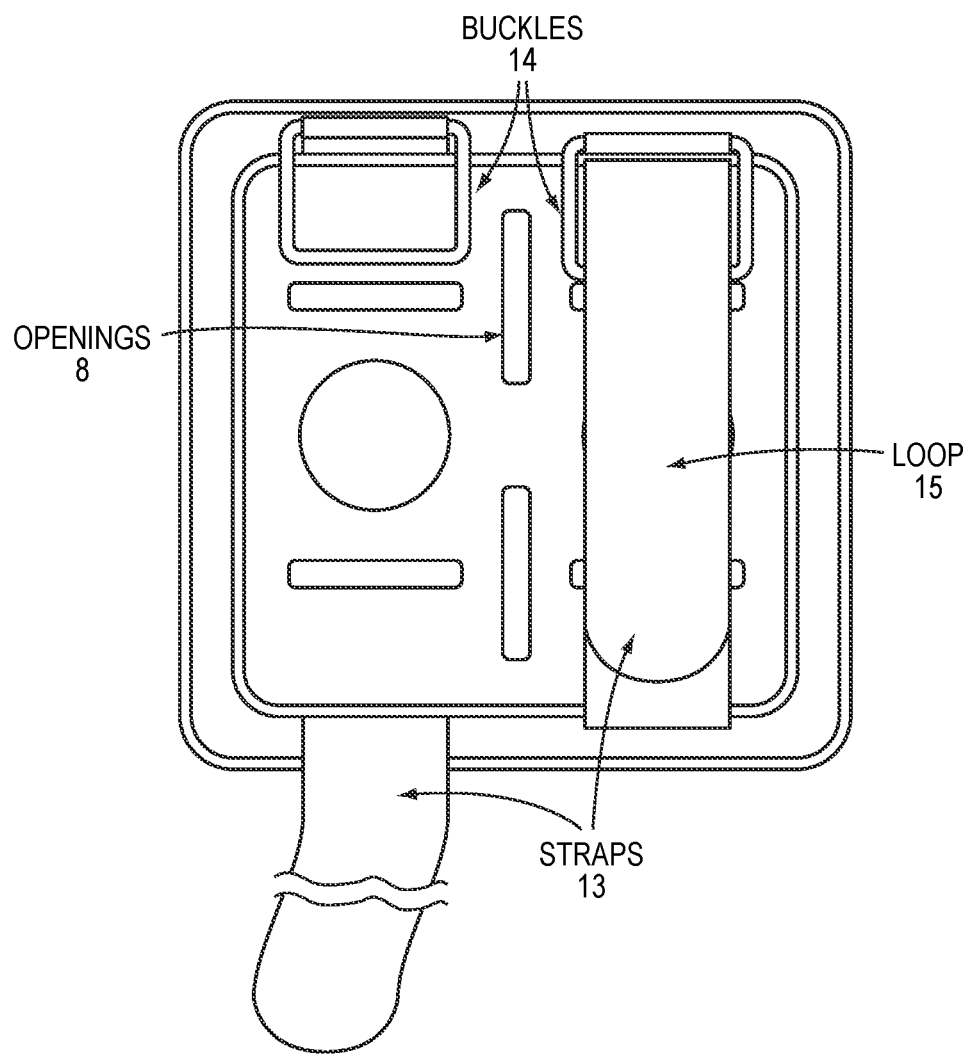
FIG. 8 is a diagram showing how straps pass through the channels of the yoke mount device holder.

FIG. 8 is a diagram showing how straps 13 pass through the channels 12. In this example, the straps 13 are non-rigid and include buckles 14 on one side. The straps 13 can be adjusted to fit any yoke size by threading the straps 13 through the buckle 14 and attaching one side of the strap 13 to another side of the strap 13 via a mechanical connector. This creates a loop 15 that wraps around any type of yoke and secures the yoke mount device holder to any type of yoke. The yoke mount device holder 1 can be secured using either one strap or two straps 13. This figure also shows openings 8 through which the straps 13 can be adjusted as explained in connection with FIG. 3. In other embodiments, the straps 13 are passed through one or more of the openings 8.

Figure 9:
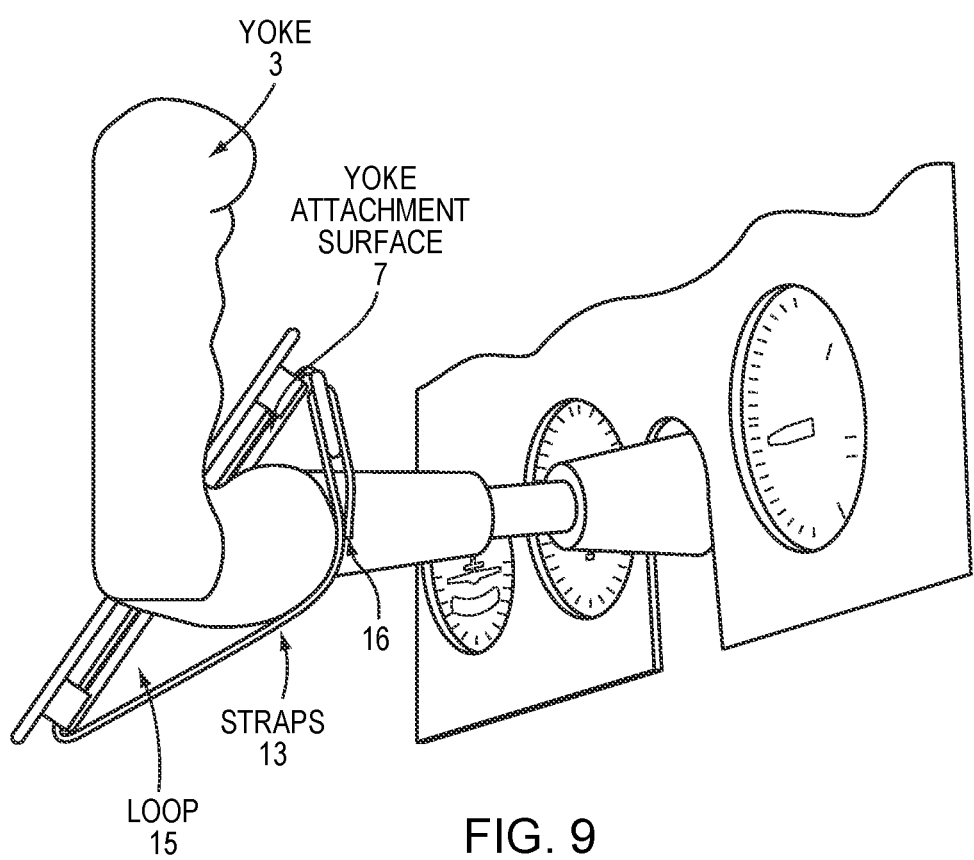
FIG. 9 is a diagram showing a side view of the yoke mount device holder attached to the yoke within an aircraft cockpit.

FIG. 9 is a diagram showing a side view of the yoke mount device holder 1 attached to the yoke 3 within an aircraft cockpit. The straps 13 pass through the yoke attachment surface 7 and wrap around the yoke 3. An end of each strap 13 attaches to part of each strap via a mechanical connector, such as a hook and loop connector (e.g., Velcro). Reference numeral 16 identifies one such attachment along straps 13. This creates a loop 15 that secures the device holder to the yoke 3.

The straps 13 are adjustable and formed from non-rigid materials. The straps 13 provide complete flexibility in attaching the yoke mount device holder 1 to any style yoke. This flexibility provides significant advantages over conventional device holders, including claw mounts, knee strap mounts, or window mounts.

Conventional device holders are limited in their use and application. For example, conventional claw mounts tend to be limited in use to one particular style yoke. Conventional knee strap mounts are uncomfortable and tend to disrupt a pilot's line of sight by encouraging the pilot to look down and away from the cockpit. Conventional window mounts interfere with a pilot's line of sight and tend to limit pilot visibility out of the cockpit.

Figure 10:
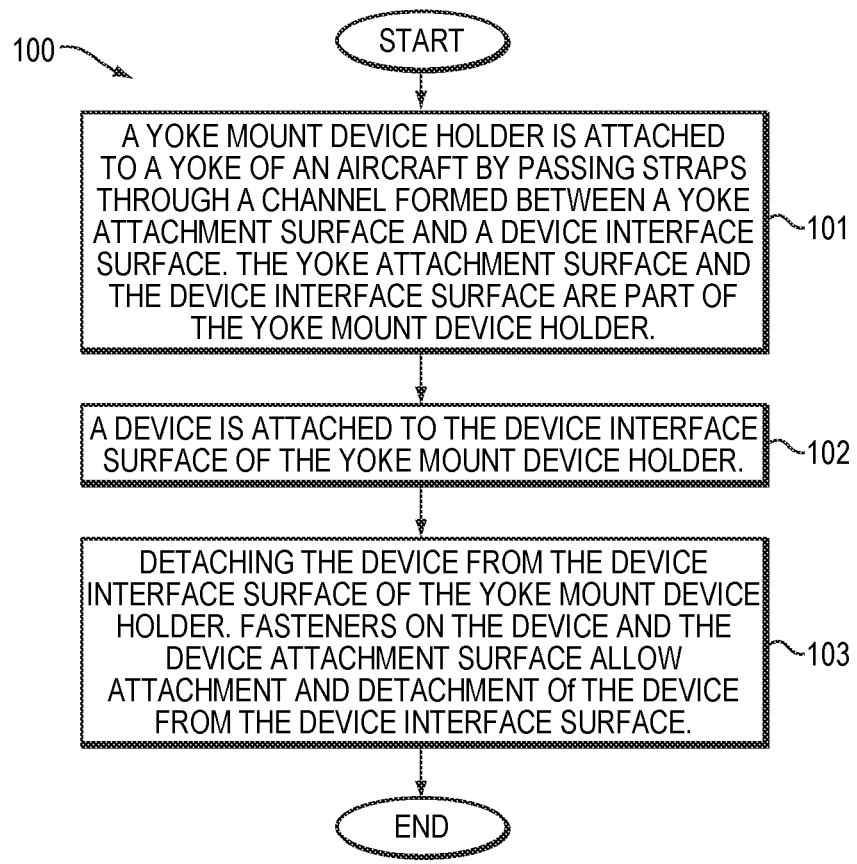
FIG. 10 is a flowchart of a method of using a yoke mount device holder in accordance with one embodiment.

FIG. 10 is a flowchart of a method 100 in accordance with one novel aspect. The method 100 is one technique of using the yoke mount device 1. In a first step (step 101), a yoke mount device holder 1 is attached to a yoke 3 of an aircraft by passing straps 13 through a channel 12 formed between a yoke attachment surface 7 and a device interface surface 4. The yoke attachment surface 7 and the device interface surface 4 are part of the yoke mount device holder 1. In a second step (step 102), a device 2 is attached to the device interface surface 4 of the yoke mount device holder 1. In a third step (step 103), detaching the device 2 from the device interface surface 4 of the yoke mount device holder 1, fasteners 5 and 6 on the device 2 and the device attachment surface 4 allow attachment and detachment of the device 2 from the device interface surface 4.

Figure 11:
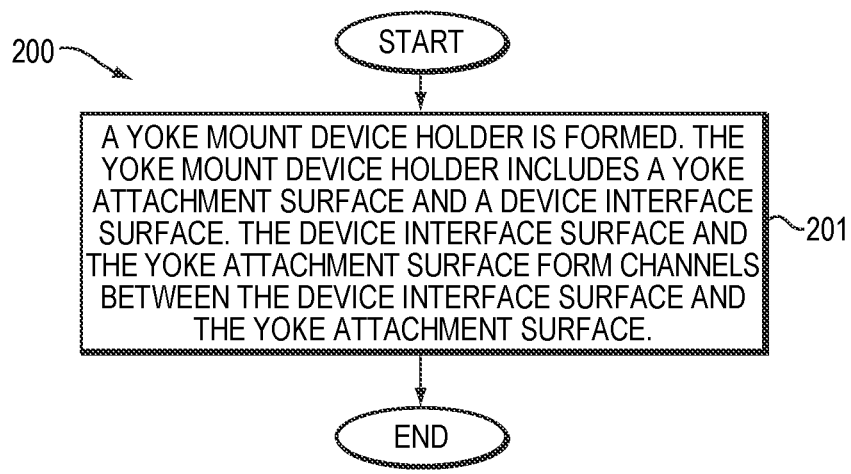
FIG. 11 is a flowchart of a method of manufacturing a yoke mount device holder in accordance with one embodiment.

FIG. 11 is a flowchart of a method 200 in accordance with one novel aspect. The method 200 is a technique of using the yoke mount device holder 1. The yoke mount device holder 1 includes a yoke attachment surface 7 and a device interface surface 4. The device interface surface 4 and the yoke attachment surface 7 form channels 12 between the device interface surface 4 and the yoke attachment surface 7.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An apparatus configured to removably attach a device to a yoke of an aircraft comprising:
    a yoke attachment surface, wherein the yoke attachment surface is configured to attach to the yoke of the aircraft; and
    a device interface surface, wherein the device interface surface is configured to attach to the device or to a device case that retains the device, wherein the device interface surface and the yoke attachment surface are separated by at least one spacer that forms channels between the device interface surface and the yoke attachment surface; and
    a strap that passes through one of the channels such that part of the strap is disposed between the yoke attachment surface and the device interface surface.

2. The apparatus of claim 1, wherein the yoke attachment surface attaches to the yoke of any aircraft via straps that pass through the channels.

3. The apparatus of claim 1, wherein the yoke attachment surface has a plurality of openings.

4. The apparatus of claim 3, wherein the plurality of openings of the yoke attachment surface provides access to the channels.

5. The apparatus of claim 3, wherein the plurality of openings of the yoke attachment surface have at least two different shapes or at least two different sizes.

6. The apparatus of claim 1, wherein the device interface surface has a larger surface area as compared to the yoke attachment surface.

7. The apparatus of claim 1, wherein the strap is interchangeable across different airplane yoke dimensions, wherein the strap enters or exits through openings in the yoke attachment surface, wherein the strap is replaceable with other straps having different or same dimensions, wherein the device is attachable to the device interface surface, and wherein the strap is adjustable and removable from the apparatus.

8. The apparatus of claim 1, further comprising:
- a first fastener that attaches to the device interface surface; and
- a second fastener that attaches to the device or to the device case, wherein the device or device case is attachable or detachable from the device interface surface.

* * * * *